United States Patent [19]

Spiegelhoff

[11] 4,307,913

[45] Dec. 29, 1981

[54] ADJUSTABLE ARM-REST FOR VEHICLE SEAT

[75] Inventor: Steven P. Spiegelhoff, Mukwonago, Wis.

[73] Assignee: Milsco Manufacturing Company, Milwaukee, Wis.

[21] Appl. No.: 155,107

[22] Filed: Jun. 2, 1980

[51] Int. Cl.³ .............................................. A47C 7/54
[52] U.S. Cl. .................................... 297/417; 297/115; 297/411
[58] Field of Search ............... 297/417, 411, 113, 115, 297/161, 162

[56] References Cited

U.S. PATENT DOCUMENTS

| 3,168,346 | 2/1965 | Rei, Jr. | 297/113 |
| 4,165,901 | 8/1979 | Swenson et al. | 297/417 |
| 4,176,878 | 12/1979 | Koutsky | 297/411 |
| 4,230,414 | 10/1980 | Cheshire | 297/417 |
| 4,244,623 | 1/1981 | Hall et al. | 297/417 |

Primary Examiner—Francis K. Zugel

Attorney, Agent, or Firm—James E. Nilles; James R. Custin

[57] ABSTRACT

An arm-rest for a vehicle seat comprises an arm-rest carrier confined to substantially translatory vertical motion and an arm-rest member pivoted to the arm-rest carrier to tilt between a normal horizontal orientation and an out-of-the-way vertical orientation. A pawl and ratchet mechanism defines several positions of heightwise adjustment of the arm-rest carrier, at each of which it is held against descent, but is can be readily raised from a lower to an upper limit of its vertical motion. At said upper limit a pawl latch captivates the pawl, holding it away from the ratchet to permit descent of the arm-rest carrier. At said lower limit the pawl latch is disengaged from the pawl, which re-engages the ratchet. A locking element movable on the arm-rest carrier is biased to a locking position in which it engages the arm-rest member to hold the same in its horizontal orientation; but in a raised releasing position of the arm-rest carrier the locking element is disengaged from the arm-rest member to allow it to be tilted to its vertical orientation, from which it can be tilted back to horizontal in any position of the arm-rest carrier.

12 Claims, 11 Drawing Figures

ADJUSTABLE ARM-REST FOR VEHICLE SEAT

FIELD OF THE INVENTION

This invention relates to arm-rests for seats, particularly vehicle seats, and the invention is more specifically concerned with an arm-rest which is readily adjustable as to height and which is normally locked in a horizontally extending orientation but is readily tiltable to a vertical out-of-the-way orientation.

BACKGROUND OF THE INVENTION

The operator of an over-the-road truck is often required to remain in the driver's seat through substantially the whole of a working day that may be long and trying. For such an operator, seating comfort is more than a mere convenience, inasmuch as the fatigue that results from occupying an uncomfortable seat can have a direct bearing upon the safety with which the vehicle is operated and possibly upon the long-term health of the operator.

Until comparatively recent years, it was not customary to provide arm-rests on the drivers' seats of over-the-road trucks or the operators' seats of other highway and off-highway vehicles; but with increased awareness of the need for seating comfort, it has come to be recognized that arm-rests are useful both for supporting the upper arms to minimize shoulder muscle fatigue and for supporting the torso against side sway. To be fully effective for the performance of both of these functions, the arm-rests should be adjustable in height, so that their positions can be accommodated to the physical dimensions of the seat occupant.

Furthermore, heightwise adjustment of the arm-rests should be very easily accomplished so that the seat occupant can provide for an occasional change in position without having to divert his attention from operation of the vehicle. For quick and easy arm-rest adjustment, the seat occupant should not have to fumble for a push button, release lever or the like. On the other hand, there should not be any projecting parts on the arm-rest adjusting mechanism that can catch on clothing or otherwise present a hazard to the occupant of a moving vehicle.

It should also be kept in mind that a person usually gets into and out of a vehicle seat from one side of it, and that an arm-rest in its normal position would be in the way of entry to the seat and departure from it. It is therefore especially important in the case of a vehicle seat that the arm-rest be quickly and easily movable to an out-of-the-way position.

The problem of providing a vehicle seat arm-rest with a substantial range of heightwise adjustment (e.g., on the order of eight to ten inches vertically) does not have an obvious solution. The arm-rest cannot very well be confined to vertical motion by means of fixed, upright guide means on the seat frame because such guide means would either project above the arm-rest when it was in the lower part of its range of positions or would limit the range of adjusting vertical motion of the arm-rest proper. The problem is further complicated by the need to provide for vertical adjustment and tilting reorientation of the arm-rest in accordance with the requirements outlined above.

SUMMARY OF THE INVENTION

With the above stated considerations in mind, it is a general object of this invention to provide an arm-rest which is especially suitable for vehicle seats and which is quickly and easily adjustable to any of a number of different positions of height as well as being quickly and easily tiltable to an out-of-the-way position in which it does not interfere with getting into and out of the seat from the side of it.

Another general object of the invention is to provide an arm-rest which is quickly and easily adjustable through a substantially large vertical range of positions and which has an adjusting mechanism wherein there are no projecting parts that might present a hazard in a moving vehicle.

More specifically, it is an object of this invention to provide an arm-rest having a number of different positions of heightwise adjustment and capable of being established in any desired one of those positions by merely raising it to the desired position, said arm-rest being releasable for downward movement by simply raising it to an upper limit of its range of vertical motion, whereupon it drops down to a lower limit of that range of motion, from which it can again be adjusted upwardly.

It is also a specific object of this invention to provide a vertically adjustable arm-rest for vehicle seats and the like that is normally locked in a horizontal operative orientation but which need only be brought to a raised position to be unlocked for tilting to a vertical out-of-the way orientation, and which can at any time be swung back to its normal orientation from that vertical orientation.

It is also a specific object of this invention—and an important one from a practical standpoint—to provide an adjustable arm-rest of the character described that has no tendency to rattle, even when subjected to normal vehicle vibrations and after undergoing a substantial amount of wear.

In the arm-rest assembly of this invention, which is intended for a seat having structure comprising relatively stationary parts, there is an arm-rest carrier which is supported and guided for movement along a defined path adjacent to one side of the seat, to and from a release position, and which is maintained in a substantially fixed orientation relative to said stationary parts. An arm-rest member is pivoted to said arm-rest carrier to swing relative thereto about a tilting axis that extends sidewardly relative to the seat, said arm-rest member having an elongated portion that extends transversely to said tilting axis and having a pair of abutment surfaces that are spaced from said tilting axis in opposite directions lengthwise of said elongated portion. An abutment on the arm-rest carrier is engageable by one of said abutment surfaces on the arm-rest member to define a normal orientation of the latter to and from which it is tiltable and in which its said elongated portion extends substantially horizontally. A locking element is carried by the arm-rest carrier and is movable relative to it to and from a holding position towards which the locking element is biased and in which a supporting surface on the locking element engages the other of said abutment surfaces to releasably confine the arm-rest member in its normal orientation. Cooperating abutment means on said structure and on the locking element are arranged to be engaged by movement of the arm-rest carrier to its said release position and by their engagement to move the locking element out of its holding position, thus freeing the arm-rest member to swing about the tilting axis to and from a tilted orientation in which said elongated portion of the arm-rest member extends substantially vertically.

In a preferred embodiment, the locking element is pivoted to the arm-rest carrier to swing about a cam axis which is spaced from said pivot axis and substantially parallel thereto, and said supporting surface on the locking element is curved eccentrically to the cam axis and is arranged to wedgingly engage said other of said abutment surfaces in consequence of bias-propelled motion of the locking element to its holding position. Furthermore, said supporting surface is preferably so located on the locking element as to be above and substantially in vertical alignment with said cam axis, so that the arm-rest member, in its normal orientation, exerts substantially no force upon the locking element that tends to move the same out of its holding position.

With the adjustment means of this invention, the arm-rest carrier is held against descent from any selected one of a plurality of adjustment positions to which it can be raised, but it is released for descent to a lower limit of substantially vertical motion in consequence of its being raised to an upper limit of such motion. That adjustment means comprises a pawl mounted on the arm-rest carrier for motion in opposite directions to and from a releasing position, said pawl being yieldingly biased away from said releasing position. The adjustment means further comprises a ratchet member having a succession of ratchet teeth, said ratchet member being so connected with said seat structure that in consequence of motion of the arm-rest carrier between said limits, there is relative motion between the ratchet member and the arm-rest carrier whereby the pawl is carried into successive engagement with said teeth, said teeth being formed to cooperate with the pawl in permitting rising motion of the arm-rest carrier but preventing descent thereof when the pawl is out of its releasing position. A pawl latch is mounted on the arm-rest carrier for movement relative to it, to and from a latching position towards which the pawl latch is biased and at which it can confine the pawl in its releasing position. There are cooperating cam surfaces on the pawl and on the pawl latch whereby movement of the pawl to its releasing position actuates the pawl latch to its latching position. A first actuating abutment means is connected with the ratchet member and is arranged to engage the pawl and actuate it to its releasing position in consequence of movement of the arm-rest carrier to its upper limit; and a second actuating abutment means is connected with the ratchet member and is arranged to engage the pawl latch and actuate the same out of its latching position in consequence of movement of the arm-rest carrier to its lower limit.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF INVENTION

In the accompanying drawings, the numeral 5 designates generally a seat having an arm-rest 6 that embodies the principles of this invention. The seat 5 has a generally horizontal seat part 7 that comprises a cushion, and has a more or less upright back-rest 8 that extends up from the rear of the seat part. The seat part 7 is here shown, for simplicity, as mounted on a pedestal-like supporting structure 9, but in practice the supporting structure 9 will normally provide for heightwise adjustment of the seat as a whole, particularly including the seat part 7, and it may comprise a resilient shock-absorbing mounting for the seat part 7.

An arm-rest 6 is of course located at each side of the seat 5, and the two arm-rests can be identical. Each arm-rest 6 is movable, as described hereinafter, in relation to portions of the seat structure that can be regarded as relatively stationary. In the present case, the relatively stationary seat structure can include relatively rigid frame structure (not shown) that is conventionally incorporated in the seat part 7 and a pair of boomerang-shaped bracket members 10, one at each side of the seat, by which the back-rest 8 is connected with the seat part 7 and each of which also supports one of the arm-rests 6. By means of bolts 11 or the like, each bracket member 10 is rigidly secured to the seat part frame, and the back-rest 8 extends up between the two brackets 10 and is secured to them by means of coaxial hand screws 12 that provide for tilting adjustment of the back-rest in a generally conventional arrangement.

Figure 1:
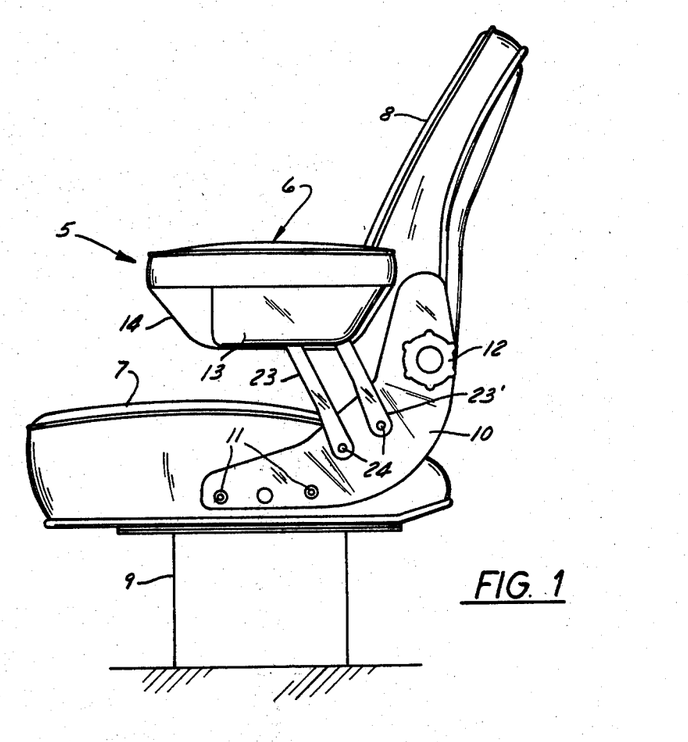
FIG. 1 is a view in side elevation of a seat having arm-rests embodying the principles of this invention.
Figure 11:
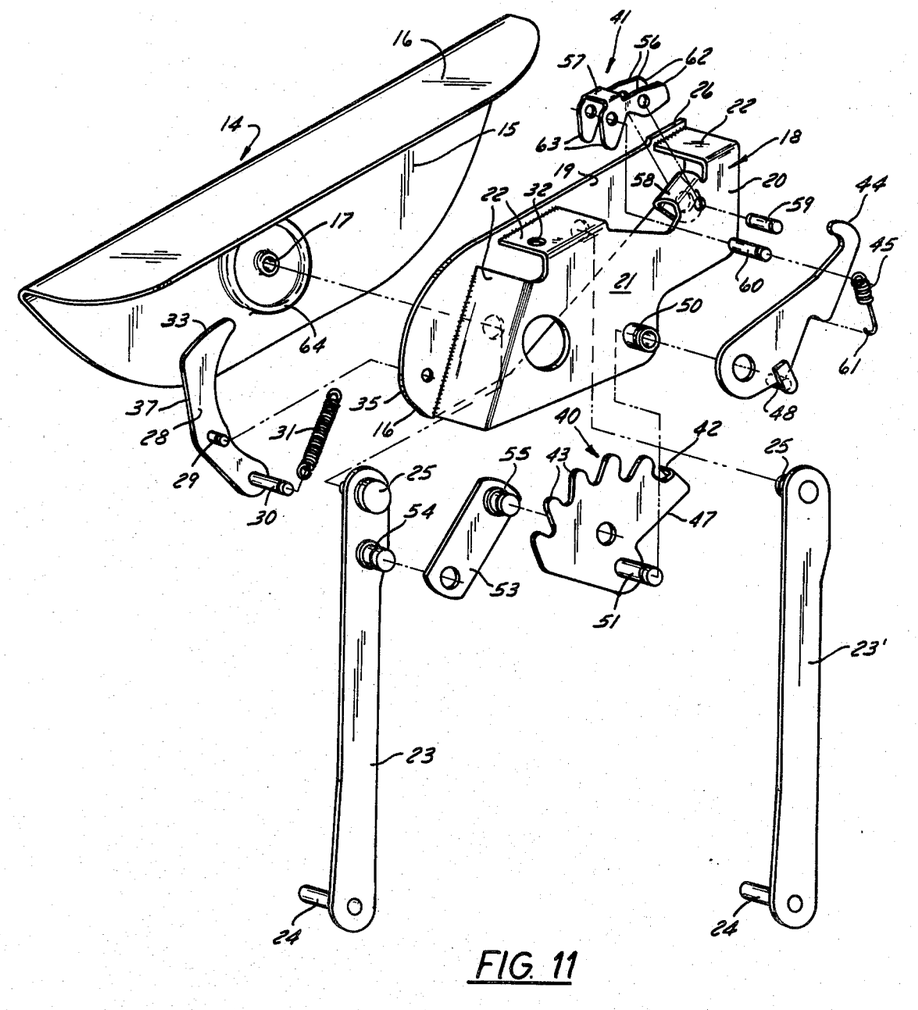
FIG. 11 is an exploded perspective view of the arm-rest mechanism.

The mechanism of each arm-rest 6, which is described hereinafter, is enclosed in a housing or cover 13 (shown only in FIG. 1) that preferably has a padded upper portion. This housing 13 overlies and is supported by an elongated arm-rest member 14 (best seen in FIG. 11) that has an L-shaped cross-section, with a vertical side wall 15 and a top wall 16 that projects laterally outwardly relative to the seat. In a functional sense, the arm-rest member 14 can be regarded as the arm-rest itself, since the cover 13 merely encloses and pads it and partakes of all its motions.

The arm-rest member 14 has a pivotal connection 17 to an elongated arm-rest carrier 18 that is confined to more or less vertical translatory motion relative to stationary parts of the seat structure. As shown, the armrest carrier 18 comprises two components 19 and 20 that are welded together, the component 19 being an elongated plate that forms a laterally inner vertical wall of the carrier, while the other component 20 is a sheet metal part that provides a vertical outer wall portion 21 of the arm-rest carrier. The component 20 has tab portions 22 that extend laterally inwardly to the plate 19 and are welded thereto to maintain the wall portions 19 and 21 of the arm-rest carrier 18 in spaced parallel relation to one another. The vertical wall 15 of the arm-rest member 14 flatwise overlies the vertical inner wall 19 of the arm-rest carrier.

To guide each arm-rest carrier 18 for substantially vertical adjusting motion in relation to relatively stationary parts of the seat frame, it has a connection with its adjacent bracket member 10 that comprises a pair of parallelogram linkage arms 23, 23', each having at one end a pivotal connection 24 with said bracket 10 and having at its other end a pivotal connection 25 with the arm-rest carrier 18. The four parallel axes defined by the pivot connections 24, 25 are located at the four corners of a parallelogram, so that the arm-rest carrier 18 maintains a constant orientation through the range of its motion, extending lengthwise in a fore-and-aft direction relative to the seat. Although the movement of the arm-rest carrier 18 is mainly vertical, it has a component of fore-and-aft horizontal movement due to swinging of the arms 23, 23' about their fixed pivotal connections 24 to the seat frame, and it will be seen that the arm-rest 6, in the course of its up and down movement, thus follows a path that tends to keep its read end close to the front surface of the back rest 8.

Figure 2:
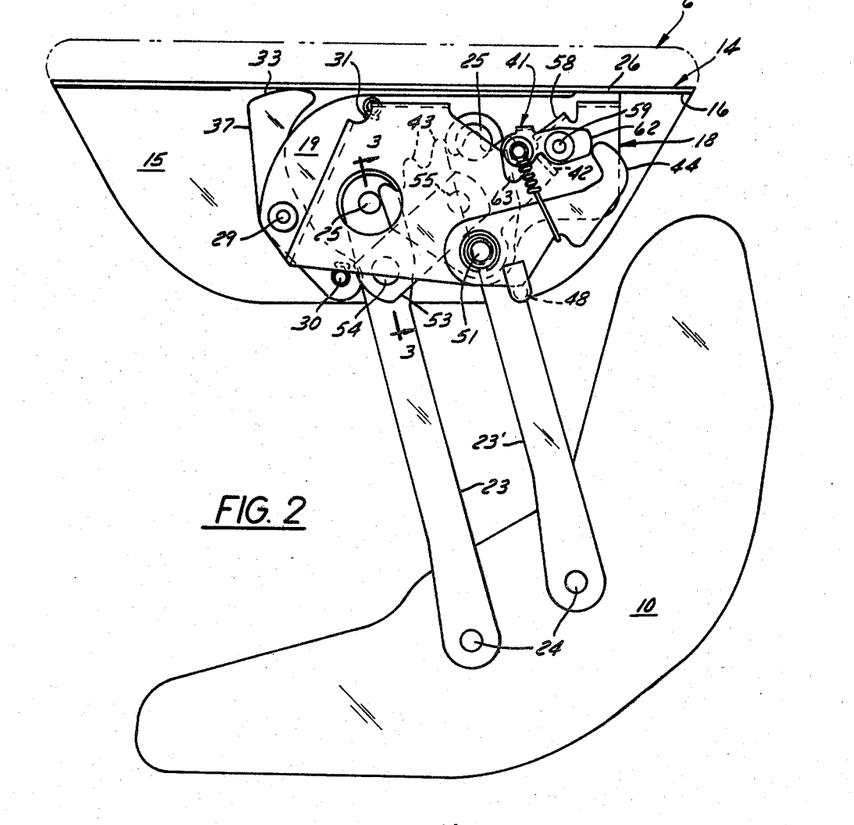
FIG. 2 is a view of the arm-rest mechanism in side elevation, with the arm-rest at its highest position of adjustment.

By reason of the pivot connection 17 between the arm-rest member 14 and the arm-rest carrier 18, the arm-rest member has two kinds of mobility relative to the stationary seat parts. One of these is for tilting of the arm-rest member 14 whereby it swings between a normal orientation (FIGS. 1, 2, 4), extending substantially horizontally fore-and-aft, and a substantially vertical orientation (FIG. 7) in which the arm-rest 6 is out of the way of a person entering or leaving the seat at the side of it. The other type of mobility is for bodily up and down adjusting motion that enables the arm-rest 6 to be positioned at any selected one of a number of different heights relative to the seat part 7.

The mechanism that provides for these two modes of armrest adjustment is explained hereinafter. At this point, attention can be given to the manner in which such adjustments are made.

Figures 8, 9:
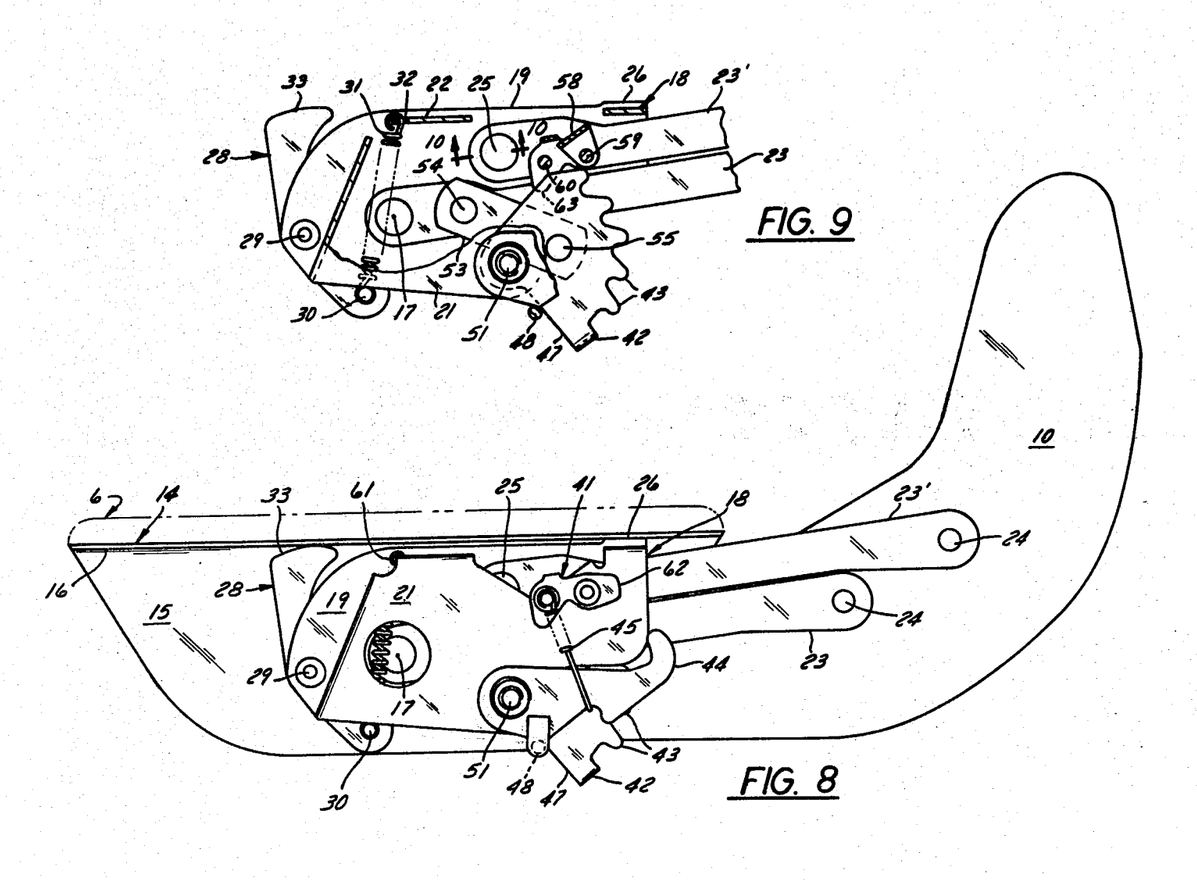
FIG. 8 is a view generally similar to FIGS. 2 and 4 but showing the arm-rest at its lower limit of motion at which the height adjustment mechanism is restored to its operative condition for height adjustment.
FIG. 9 is a view in side elevation of the height adjustment per se, in its condition shown in FIG. 8, with the outer side wall of the arm-rest carrier removed.

For heightwise adjustment, each arm-rest 6 can be moved upwardly to any one of several height positions between its limits of vertical motion, and at each such position it is locked against downward motion but can be lifted to a higher position. To adjust an arm-rest to a lower position, it is merely lifted all the way to its upper limit of vertical motion (FIG. 4), and this causes it to be released for movement all the way down to its lower limit (FIG. 8). As it is raised from its lower limit, it once again locks itself against downward movement from each position of adjustment but can be readily lifted to any higher position. At the lower limit of the arm-rest 6 its top surface can be approximately at the level of the top surface of the seat part 7.

The arm-rest member 14 is normally locked in its horizontal orientation. To release it for tilting to its vertical orientation it is merely moved up and all the way to a limit position shown in FIG. 7. The limit position at which tilting release of the arm-rest occurs can be the same upper limit of vertical motion at which the arm-rest is released for descent to its lower limit. However, as here shown and described, and as is preferred, the arm-rest is unlocked for tilting by moving it a small distance rearwardly beyond the upper limit of its vertical motion (compare FIGS. 4 and 7) so that it can remain locked against tilting out of its normal horizontal orientation through all stages of height adjustment, and can be unlocked for tilting only as the result of a small but deliberate additional movement in the upwardrearward direction. When in its position for tilting release and tilted to its vertical orientation (as in FIG. 7) the arm-rest is approximately even with the back rest 8.

Once tilted to its vertical orientation, the arm-rest 6 can be left in that orientation through the range of its vertical motion. It can be readily swung back to its horizontal orientation at any time and in any heightwise position; and, once returned to its horizontal orientation, it remains locked therein unless or until it is in the fully raised and rearward position shown in FIG. 7.

TILTING CONTROL MECHANISM

Figure 3:
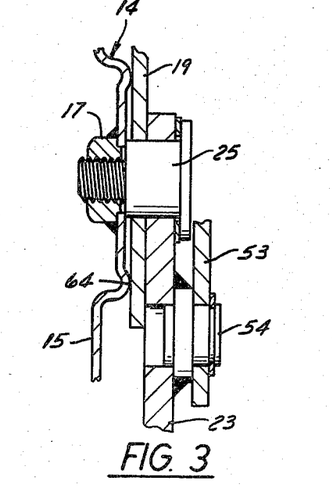
FIG. 3 is a fragmentary sectional view taken on the plane of the line 3—3 in FIG. 2.

The pivot connection 17 by which the arm-rest member 14 is tiltably secured to the arm-rest carrier 18 can comprise (as best seen in FIG. 3) a shoulder nut welded onto the armrest member and into which is threaded a shoulder bolt 25 that extends through the front parallelogram arm 23 and the arm-rest carrier 18 and provides the pivotal connection between them. The axis of the pivot connection 17 is about midway between the front and rear ends of the arm-rest member 14 and is likewise about midway between the top and bottom edges of the vertical wall portion 15 of that member 14. The axis of the pivot 17 is likewise located between the front and rear ends of the arm-rest carrier 18 and in downwardly spaced relation to the upper edge of its inner plate-like member 19.

The upper edge of said plate-like member 19 is formed with a small upward abutment projection 26 near the rear end thereof that cooperates with the horizontal wall portion 16 of the arm-rest member 14 to define the normal horizontal orientation of the arm-rest member 14, toward and from which it can be tilted. Cooperating with the abutment 26 to releasably maintain the arm-rest in its normal orientation is a lever-like locking element 28 that has a medial pivotal connection 29 to the arm-rest carrier 18. The axis of the pivot or fulcrum 29 for the locking element 28, which is of course parallel to the tilting axis defined by the pivot connection 17, is spaced forward of said connection 17.

The locking element 28 has a lower leg which normally projects obliquely downwardly and rearwardly from its pivot or fulcrum 29 and at the lower end of which there is a laterally projecting pin 30 that provides securement for the lower end of a coiled tension spring 31. The upper end of the tension spring 31 is connected to a fixed spring securement 32, which can comprise a hole in one of the tab portions 22 on the outer member of the arm-rest carrier 18. The spring 31 thus extends upward and at a slightly rearward inclination from the spring securement 30 on the locking element 28, and it so biases the locking element that its nearly vertical upper arm tends to swing forwardly.

Figure 6:
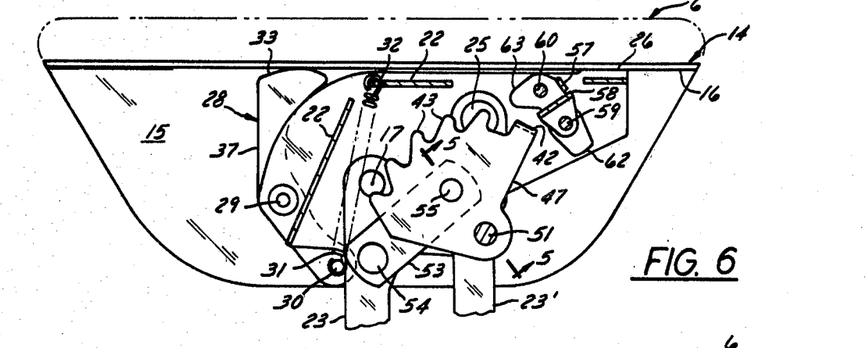
FIG. 6 is a view of the arm-rest adjustment mechanism in the condition in which it is shown in FIG. 4, but with the outer side wall of the arm-rest carrier removed to better show parts of the mechanism.

The upper arm of the locking element 28 has a top edge that comprises a supporting surface or cam 33 which is curved eccentrically to its pivot or fulcrum 29. When the arm-rest member 14 is in its normal position, the cam edge 33 engages the underside of the horizontal wall 16 of the arm-rest member at a location that is spaced forward of the tilting pivot 17, and the locking element then cooperates with the fixed abutment 26 to confine the arm-rest against tilting about the pivot 17. As can be seen from any of FIGS. 2, 4, or 6, the portion of the cam edge 33 that then engages the arm-rest member 14 is almost vertically above the pivot or fulcrum 29 of the locking element 28, so that no swinging force is imposed upon the locking element by the arm-rest or any weight that it supports. Furthermore, the cam edge 33 is so configured that the forward biasing force which the spring 31 imposes upon the upper arm of the locking element 28 produces a wedging effect against the arm-rest member 14, whereby the arm-rest member is maintained in firm engagement with the abutment 26, notwithstanding any wear on that abutment or on the cam edge 33, to thus prevent annoying minor rocking and rattling of the arm-rest about its pivot 17.

Figure 7:
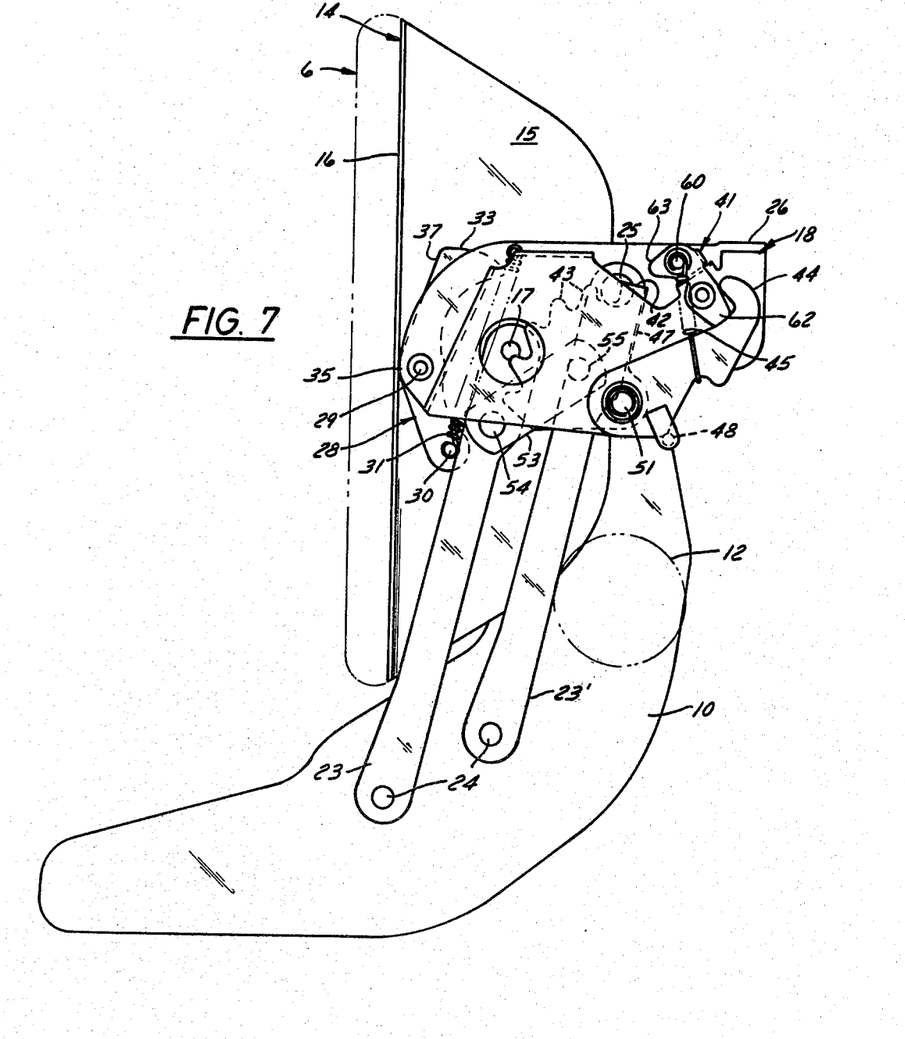
FIG. 7 is a view generally similar to FIGS. 2 and 4 but showing the mechanism in its condition at which the arm-rest is released for tilting to its out-of-the-way vertical position.

The configuration of the cam edge 33 is also such that rearward swinging of the upper arm of the locking element 28, against the bias of the spring 31, disengages said cam edge 33 from the arm-rest member 14, thus allowing the latter to be tilted away from the fixed abutment 26 and towards its vertical orientation. Such swinging of the locking element 28 to its releasing position is effected, as illustrated in FIG. 7, by the engagement of abutment means on the locking element 28 against abutment means on another part of the seat structure, occurring during movement of the arm-rest carrier 18 to and slightly beyond the upper limit of its vertical motion. As shown, the abutment means on the locking element 28 comprises the laterally outwardly projecting pin 30 that provides the lower securement for the spring 31, and the cooperating abutment means comprises the front parallelogram arm 23.

The locking element 28 overlies the laterally inner surface of the plate-like arm-rest carrier component 19 and is thus flatwise confined between that component and the vertical wall 15 of the arm-rest member 14. The vertical wall 15 of the arm-rest member 14 is formed with an inwardly offset annular land or friction ring 64 around its pivot 17, to provide a space between it and the flatwise adjacent wall 19 of the arm-rest carrier, in which space the locking element 28 is accommodated. The pin 30 on the lower end of the locking element 28 extends beneath the lower edge of the plate-like member 19 and projects laterally beyond it, the spring 31 being attached to it near its outer end.

Figure 4:
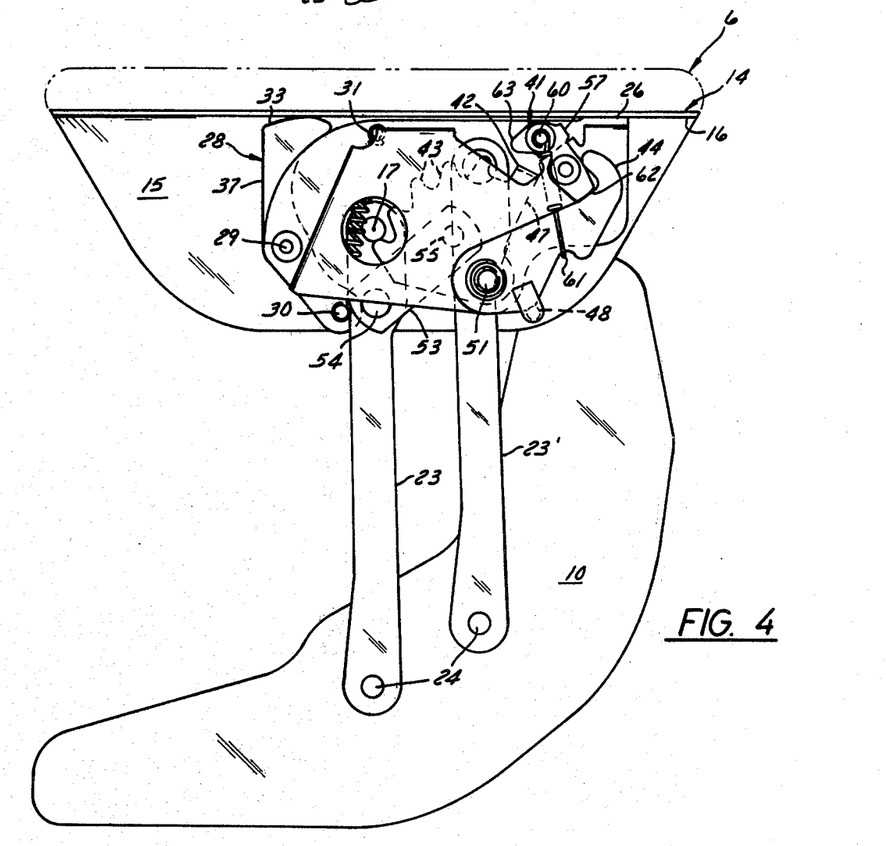
FIG. 4 is a view generally similar to FIG. 2 but showing the arm-rest at an upper limit of its vertical motion at which the height adjustment mechanism is released to permit the arm-rest to move downward.
Figure 5:
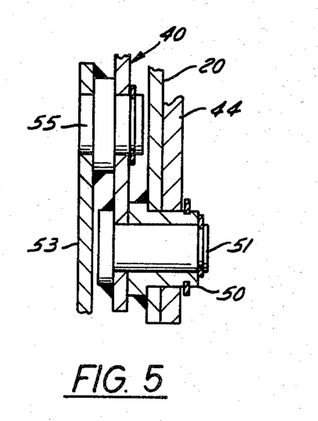
FIG. 5 is a fragmentary sectional view taken on the plane of the line 5—5 in FIG. 4.

When the arm-rest carrier 18 attains the upper limit of its vertical motion (parallelogram arms 23, 23' vertical, as shown in FIG. 4) the pin 30 encounters the front edge of the parallelogram arm 23; and subsequent rearward movement of the arm-rest carrier to the FIG. 7 position imparts rearward swinging to the portion of the locking element 28 that comprises its cam edge 33, disengaging that cam edge from the arm-rest member 14. After the arm-rest member 14 has been tilted substantially out of its horizontal orientation, any re-engagement of it against the locking element 28 will merely cam the latter out of the way so that the arm rest member can be readily swung all the way to its vertical orientation.

When the arm-rest member 14 arrives at its vertical orientation, its laterally projecting wall portion 16 engages an abutment 35 on the arm-rest carrier 19, spaced forwardly of the pivot 17 and a little below the level of that pivot, and the abutment 35 of course prevents the arm-rest member from being swung beyond the vertical.

It will be apparent that once the arm-rest member 14 has been brought to its vertical orientation, it can remain in that orientation through the whole range of motion of the arm-rest carrier 18. However, it can at any time be swung back to its horizontal orientation because the front edge 37 of the locking element 28 comprises a cam whereby tilting of the arm-rest member 14 away from its vertical orientation swings the locking element 28 against the bias of the spring 31. When the arm-rest member 14 returns to engagement with the abutment 26, the spring 31 propels the locking element 28 back to its wedge-like locking engagement with the armrest member.

In the preferred position of the arm-rest for tilting release, wherein the parallelogram arms 23, 23' are inclined slightly beyond the vertical, the rear parallelogram arm 23' can engage the hand screw 12, which thus supports the armrest against further downward-rearward swinging. By its own weight the arm-rest is thus maintained in its out-of-the-way position and orientation.

HEIGHTWISE ADJUSTMENT MECHANISM

The several positions of heightwise adjustment of the arm-rest carrier 18 relative to the stationary structure of the seat are defined by a ratchet sector 40 that rotates on the arm-rest carrier in correspondence with its upward and downward movement, in cooperation with a pawl 41 that is mounted on the arm-rest carrier 18 for swinging movement relative thereto. As the arm-rest carrier 18 nears its upper limit of vertical motion, an abutment 42 on the ratchet sector 40, as described hereinafter, swings the pawl 41 to a disengaged position, well clear of the teeth 43 on the ratchet sector, and thus carries the pawl into the captivating embrace of a claw-like pawl latch 44 that is also pivoted to the armrest carrier 18. A tension spring 45, reacting between the pawl 41 and the pawl latch 44, biases the pawl 41 downward towards engagement with the ratchet sector teeth 43 and biases the pawl latch 44 upward towards its operative position in which it can hold the pawl 41 out of the engagement with those teeth.

When the pawl 41 is captivated by the pawl latch 44, the arm-rest carrier 18 can drop down from its upper limit of vertical motion (shown in FIG. 4) to its lower limit (FIG. 8). As the arm-rest carrier 18 moves to the lower limit position, cooperating actuating abutments 47 and 48, on the ratchet sector 40 and on the pawl latch 44, respectively, swing the pawl latch 44 to a position in which it releases the pawl 41 to swing back down into normal engagement with the ratchet sector teeth 43. Thereafter, as the arm-rest carrier 18 is raised, successive teeth 43 on the ratchet sector cooperate with the pawl 41 in a known manner to permit upward movement of the arm-rest carrier 18 but lock it against downward movement from any position of adjustment in which the pawl 41 is engaged with a tooth 43.

Turning now to a more detailed consideration of the structure comprising the height adjustment mechanism, a laterally outwardly projecting tubular bushing 50 is fixed to the outer wall 21 of the arm-rest carrier 18, spaced behind and below the pivot 17 about which the arm-rest member 14 swings. The tubular bushing 50 serves as a trunnion or pivot for the pawl latch 44 and also serves as a bearing for a laterally outwardly projecting shaft 51 on the ratchet sector 40, about which that sector rotates. The teeth 43 on the ratchet sector 40 are spaced at like radial distances from the axis of the shaft 51 as well as being spaced at equal circumferential distances from one another.

Rotation is imparted to the ratchet sector 40 in correspondence with up and down movement of the arm-rest carrier 18 by means of a short link 53 that has its opposite ends respectively connected with the front parallelogram arm 23 and the ratchet sector 40. The pivot connection 54 between the link 53 and the parallelogram arm 23 is spaced inwardly along said arm from its pivot connection 25 to the inner wall 19 of the arm-rest carrier. The pivot connection 55 between the link 53 and the ratchet sector 40 is eccentric to the latter, between its shaft 51 and its toothed circumference. The ratchet sector 40 is thus rotated about its shaft 51 in consequence of swinging of the front parallelogram arm 23 relative to the arm-rest carrier 18. With reference to the showing of FIGS. 9, 2, and 6 (which respectively illustrate successive stages of upward movement of the arm-rest carrier 18), raising the arm-rest carrier causes counterclockwise rotation of the ratchet sector 40.

In the direction from side to side of the seat, the front parallelogram arm 23, the link 53 and the ratchet sector 40 are confined between the vertical walls 19 and 21 of the arm-rest carrier 18, while the pawl latch 44 overlies the outer surface of the outer wall 21 of the arm-rest carrier, and the pawl 41 is arranged to more or less straddle that wall.

The pawl 41 comprises a pair of arms 56 that can be identical and are connected in parallel relation to one another by means of an integral transverse tie member 57. The arm-rest carrier 18 has a U-shaped boss portion 58 that is bent out of its vertical wall 21, and the pawl 41 is pivoted to that boss portion in straddling relation thereto by means of a pin 59 that bridges across its arms 56. Another pin 60, bridging the two pawl arms 56 near their front ends, comprises the part of the pawl that directly engages the ratchet sector teeth 43. The pin 60 projects laterally outwardly to provide a connection between the pawl 41 and the upper end of the tension spring 45. The lower end portion of the spring 45 is formed as a hook 61 that is engaged under the lower edge of the pawl latch 44, so that said spring biases the pawl 41 downwardly and the pawl latch 44 upwardly.

The abutment 42 on the ratchet sector 40, whereby the pawl 41 is swung into captivating engagement with the pawl latch 44, comprises a laterally inturned tab on the ratchet sector, so located as to engage the pawl 41 just after the pawl has been passed by the last tooth 43 in the clockwise direction around the sector. This abutment 42 on the ratchet sector engages a nose-like cam portion 63 on the front of the laterally inner arm 56 of the pawl. Said cam portion 63 projects a substantial distance below the ratchet engaging pin 60, and when it is engaged by the abutment 42, the pawl is lifted to a substantial height, to cause a tail portion 62 on the rear of the pawl to be swung downwardly into captivating engagement with the pawl latch 44. The rear edge of the tail portion 62 is normally engaged by the hook-like rear end portion of the pawl latch 44, and the pawl latch is thereby held at a normal upper limit of its swinging motion (FIG. 2) at which it maintains tension on the spring 45 to bias the pawl 41 downwardly into cooperation with the ratchet teeth 43. But when the pawl 41 is lifted by the ratchet sector abutment 42, the hook-like free end portion of the pawl latch 44 swings up and over its tail portion 62 and latches the pawl against swinging back down, as shown in FIGS. 4 and 7.

The pawl latch 44 thus confines the pawl 41 in a releasing position wherein the tooth engaging pin 60 of the pawl is well clear of the ratchet teeth 43, leaving the ratchet sector 40 free to rotate clockwise while the armrest 6 drops to its lower limit (FIG. 8). At some point in the clockwise rotation of the ratchet sector 40, its righthand edge, comprising the actuating abutment 47, engages the abutment 48 on the pawl latch 44 and swings the pawl latch downward to disengage it from the tail portion 62 of the pawl, thus permitting the pawl 41 to re-engage the ratchet sector. In most cases the actuating abutment 48 will be at such a location along the pawl latch 44 that the pawl 41 will re-engage the extreme left-hand tooth 43 on the ratchet sector 40, in a full-down position of the armrest 6; but in special cases the abutment 48 can be so located that the pawl 41 is released for engagement with some other ratchet tooth, to limit downward movement of the arm-rest. As shown, the actuating abutment 48 on the pawl latch 44 is a laterally inwardly projecting pin comprising part of an L-shaped dog welded to the pawl latch near its lower edge to the rear of the fixed bushing 50 on which it swings.

Upon being released by the pawl latch 44, the pawl 41 of course cooperates with the ratchet sensor 40 to hold the arm-rest in any position of height adjustment defined by a ratchet tooth 43.

Figure 10:
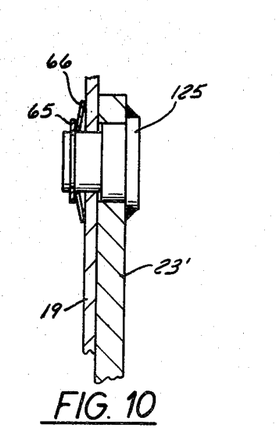
FIG. 10 is a fragmentary sectional view taken on the plane of the line 10—10 in FIG. 9.

It will be appreciated that the arm-rest carrier 18 need not literally drop of its own weight when the pawl 41 is in its releasing position but that, instead, there is preferably a small amount of friction in the system so that a light pressure is required to force it down. To this end, the pivot connections can be as illustrated in FIG. 10, wherein the connection 25 between the rear parallelogram arm 23' and the plate-like component 19 of the arm-rest carrier is shown as comprising a shoulder stud 125 secured to said parallelogram arm and extending laterally inwardly through a hole in the wall 19, a spring clip 65 seated in a circumferential groove in the stud 125, near its inner end, and a Belleville washer 66 confined under axial compression between the spring clip 65 and the wall 19. In addition to providing the desired friction, the arrangement maintains tension on the joint that prevents rattling.

From the foregoing description taken with the accompanying drawings, it will be apparent that this invention provides an arm-rest that is especially well suited for vehicle seats because it can be readily established in any desired position of heightwise adjustment and can also be readily tilted between a horizontal orientation in which it is normally locked and a vertical out-of-the-way orientation, all without the need for actuating buttons, levers or the like that would require attention or constitute possible hazards in a moving vehicle.

What is claimed as the invention is:

1. An arm-rest assembly for a seat having structure comprising stationary parts, said arm-rest assembly being characterized by:

A. an arm-rest carrier supported and guided for movement along a defined path adjacent to one side of the seat, to and from a release position, and maintained in a substantially fixed orientation relative to said stationary parts;

B. an arm-rest member pivoted to said arm-rest carrier to swing relative thereto about a tilting axis that extends sidewardly relative to said seat, said arm-rest member (1) having an elongated portion that extends transversely to said tilting axis and
(2) having a pair of abutment surfaces that are spaced from said tilting axis in opposite directions lengthwise of said elongated portion;

C. an abutment on the arm-rest carrier, engageable by one of said abutment surfaces on the arm-rest member to define a normal orientation of the latter to and from which it is tiltable and in which its said elongated portion extends substantially horizontally;

D. a locking element carried by said arm-rest carrier and movable relative thereto to and from a holding position towards which the locking element is biased and in which a supporting surface on the locking element engages the other of said abutment surfaces to releasably confine the arm-rest member in its normal orientation; and E. cooperating abutment means on said structure and on said locking element, arranged to be engaged by movement of the arm-rest carrier to its said release position, and by engagement of which the locking element is moved out of its holding position to free the arm-rest member for swinging about said tilting axis to and from a tilted orientation in which said elongated portion extends substantially vertically.

2. The arm-rest assembly of claim 1, further characterized by:

F. a further abutment on the arm-rest carrier, cooperable with a surface on the arm-rest member to define said tilted orientation of the arm-rest member.

3. The arm-rest assembly of claim 1, further characterized by:
(1) said locking element being pivoted to said arm-rest carrier to swing about a cam axis which is spaced from said pivot axis and substantially parallel thereto, and
(2) said supporting surface being curved eccentrically to said cam axis and arranged to wedgingly engage said other of said abutment surfaces in consequence of bias-propelled motion of the locking element to its holding position.

4. The arm-rest assembly of claim 3 wherein said supporting surface is so located on the locking element as to be above and substantially in vertical alignment with said cam axis, so that the arm-rest member, in its normal orientation, exerts substantially no force upon the locking element that tends to move the same out of its holding position.

5. The arm-rest assembly of claim 3, further characterized by:
said locking element having a cam surface arranged to be engaged by the arm-rest member when it is out of its normal orientation and whereby the locking element is cammed away from its holding position to permit the arm-rest to be swung to and from its vertical orientation.

6. In a seat having relatively fixed structure that comprises a seat part and having at one side of said seat part an arm-rest that comprises an arm-rest carrier and structure whereby said arm-rest carrier is connected with said fixed structure for substantially vertical motion between upper and lower limits while being confined to a substantially fixed orientation relative to said fixed structure, adjustment means whereby the arm-rest carrier is held against descent from any selected one of a plurality of adjustment positions to which it can be raised but is released for descent to its said lower limit in consequence of being riased to its said upper limit, said adjustment means comprising:

A. a pawl mounted on said arm-rest carrier for motion relative thereto in opposite directions to and from a releasing position, said pawl being yieldingly biased away from said releasing position;

B. a ratchet member
(1) having a connection with said structure whereby movement of the arm-rest carrier between said limits causes relative motion between the ratchet member and the arm-rest carrier, and
(2) having a plurality of ratchet teeth that are successively presented to the pawl by such relative motion, said teeth being formed to cooperate with the pawl in permitting rising motion of the arm-rest carrier but preventing descent thereof when the pawl is out of its releasing position;

C. a pawl latch mounted on said arm-rest carrier for movement in opposite directions relative thereto, to and from a latching position towards which the pawl latch is biased and at which it can confine the pawl in its releasing position;

D. cooperating cam surfaces on said pawl and on said pawl latch whereby movement of the pawl to its releasing position actuates the pawl latch to its latching position and thus enables the pawl latch to confine the pawl in its releasing position;

E. means defining a first actuating abutment having a connection with said ratchet member and arranged to engage the pawl and actuate the same to its releasing position in consequence of movement of the arm-rest carrier to its upper limit; and F. means defining a second actuating abutment having a connection with said ratchet member and arranged to engage the pawl latch and actuate the same out of its latching position in consequence of movement of the arm-rest carrier to its lower limit.

7. The adjustment means of claim 6, further characterized by:
a spring connected with the pawl and the pawl latch and reacting between them to bias the pawl away from its releasing position and bias the pawl latch towards its latching position.

8. The adjustment means of claim 6 wherein said structure by which the arm-rest carrier is connected with said fixed structure comprises a pair of elongated parallelogram arms having swinging connections with said fixed structure and said arm-rest carrier that define a parallelogram linkage, and wherein said ratchet member comprises a ratchet sector that has a rotatable connection to said arm-rest carrier, further characterized by:
said connection between said ratchet member and said structure comprising a link having
(1) a pivot connection with one of said parallelogram arms that is between said swinging connections thereof and
(2) a pivot connection with said ratchet member that is eccentric to the axis about which it rotates.

9. In a seat having relatively fixed structure that comprises a seat part and having at one side of said seat part an arm-rest that comprises an arm-rest carrier and structure whereby said arm-rest carrier is connected with said fixed structure for substantially vertical motion between upper and lower limits while being confined to a substantially fixed orientation relative to said fixed structure, adjustment means whereby the arm-rest carrier is held against descent from any selected one of a plurality of adjustment positions to which it can be raised but is released for descent to its said lower limit in consequence of being raised to its said upper limit, said adjustment means comprising:

A. a ratchet member
  (1) having a connection with said structure whereby motion of the arm-rest carrier between said limits effects relative motion between said ratchet member and the arm-rest carrier, and
  (2) having a succession of ratchet teeth, each of which defines one of said adjustment positions;
B. a pawl having a connection with the arm-rest carrier and biased towards engagement with said teeth, said pawl being arranged to cooperate with the ratchet member in confining the arm-rest carrier against downward movement from each of said adjustment positions but to permit upward movement therefrom;
C. a pawl latch having a connection with the arm-rest carrier and arranged to captivate the pawl and hold it against its bias in a releasing position clear of said ratchet teeth;
D. cooperating pawl actuating means, on the pawl and on a part connected with the ratchet member, operative upon movement of the arm-rest carrier to its said upper limit to move the pawl into captivating engagement with the pawl latch so that the arm-rest carrier can descend to its lower limit; and
E. cooperating pawl latch actuating means, on the pawl latch and on a part connected with the ratchet member, operative upon movement of the arm-rest carrier to its said lower limit to release the pawl latch from captivating engagement with the pawl.

10. The adjustment means of claim 9, further characterized by:
  (1) the ratchet member being a sector carried by said arm-rest carrier for rotation relative thereto about an axis, and
  (2) said connection of the ratchet member with said structure being spaced from said axis so that the ratchet member rotates about said axis in consequence of motion of the arm-rest carrier between said limits.

11. The adjustment means of claim 10, further characterized by:
  (3) said connection of the pawl with the arm-rest carrier providing for swinging of the pawl substantially towards and from said axis;
  (4) said connection of the pawl latch with the arm-rest carrier providing for swinging of the pawl latch about said axis; and
  (5) the pawl being biased towards engagement with the ratchet teeth by means of a spring having one end connected with the pawl and an opposite end connected with the pawl latch and whereby the pawl latch is biased to a position in which it can confine the pawl in its releasing position.

12. An arm-rest assembly for a seat having structure comprising relatively stationary parts, said arm-rest assembly being characterized by:
A. an arm-rest carrier supported and guided for movement along a defined path adjacent to one side of the seat, to and from a release position, and maintained in a substantially fixed orientation relative to said stationary parts;
B. an arm-rest member pivoted to said arm-rest carrier to swing relative thereto about a tilting axis that extends sidewardly relative to said seat;
C. cooperating means on said arm-rest carrier and on said arm-rest member defining substantially horizontal and substantially vertical orientations of said arm-rest member between which it is swingable about said tilting axis;
D. a locking element carried by the arm-rest carrier and movable relative thereto to and from a defined locking position towards which the locking element is biased and at which it can engage a surface on the arm-rest member that is spaced from said tilting axis, to confine the arm-rest member in its horizontal orientation; and
E. cooperating actuating abutments on said locking element and on a part of said structure relative to which the arm-rest carrier is movable, arranged to effect movement of the locking element out of its locking position in consequence of movement of the arm-rest carrier to its said release position, to enable the arm-rest member to be tilted to its vertical orientation.

* * * * *